United States Patent [19]

Sato et al.

[11] Patent Number: 4,750,200
[45] Date of Patent: Jun. 7, 1988

[54] CALL METER SIGNAL RECEIVER FOR SUBSCRIBER'S PRIVATE METERING OF TELEPHONE SYSTEM

[75] Inventors: Kazuhiro Sato, Yokohama; Yoshimi Iijima, Shimotsuma; Hiroyoshi Mori, Yokohama, all of Japan

[73] Assignee: Fujitsu Limited, Kawasaki, Japan

[21] Appl. No.: 28,459

[22] Filed: Mar. 20, 1987

[30] Foreign Application Priority Data

Mar. 20, 1986 [JP] Japan ................................. 61-063165

[51] Int. Cl.⁴ ......................................... H04M 15/34
[52] U.S. Cl. .................................... 379/102; 379/115; 379/140; 379/251
[58] Field of Search ............... 379/115, 140, 130, 114, 379/102, 106, 121, 231

[56] References Cited

U.S. PATENT DOCUMENTS 4,255,621  3/1981  Marheine ............................ 379/115

Primary Examiner—Stafford D. Schreyer
Attorney, Agent, or Firm—Staas & Halsey

[57] ABSTRACT

A call meter signal receiver is provided for a subscriber's private metering system operated by a call meter signal sent from a central office. The receiver is operable both by common mode and normal mode signals. The receiver is small sized and can be installed in a central office trunk of private branch exchanger equipment. The call meter signal receiver is composed of a frequency tuned receiver including two buffer circuits, the first one for receiving the common mode and the second one for receiving the normal mode signal. The first buffer circuit is connected to the input side of a hybrid circuit of the COT, and has a high impedance, while the second buffer circuit, for receiving the normal mode signal, is connected to one of the output terminals of the hybrid circuit, and has a high impedance for voice signals. The outputs of these buffer circuits are fed to the frequency tuned receiver composed of a phase locked loop, of which frequency is tuned to 50 Hz, 12 kHz or 16 kHz by switching an externally attached circuit composed of a capacitor and resistors.

10 Claims, 4 Drawing Sheets

CALL METER SIGNAL RECEIVER FOR SUBSCRIBER'S PRIVATE METERING OF TELEPHONE SYSTEM

BACKGROUND OF THE INVENTION

The present invention relates to equipment installed in trunk circuits of a private branch exchanger (PBX) system for receiving call meter signals. More precisely, it relates to small sized subscriber's private metering (SPM) equipment which is operable by various types of metering pulses having a common mode or a normal mode.

There are various kinds of charging equipment installed in telephone offices for counting the calls of each subscriber for the purpose of charging a tariff. Recently the demand for private metering has increased, especially among PBX subscribers, or modern push button dialing telephone subscribers. Such equipment is called subscriber's private metering and abbreviated as SPM. Most SPM systems are controlled by their own clock and counter for operating their call meters. But some of the PBXs are provided with SPM equipment which is operated by a metering signal sent from the telephone office, and the demand for such an SPM system is increasing.

There are various kinds of metering signals used in telephone offices, but they can be classified into 50 Hz, 12 kHz and 16 kHz signals. Two modes of metering signals are used, called common mode and normal mode. The common mode signal is transmitted in each of the two-wire telephone lines having common phase (same phase) to each other and is sometimes called a parallel mode. The common mode is mainly used for the low frequency metering signal of 50 Hz. On the other hand, the normal mode signal is transmitted in the two-wire line with opposite phase to each other. Normal mode is sometimes called a differential mode signal, and is mainly used for higher frequency metering signals of 12 kHz or 16 kHz.

The SPM equipment which is operated by such metering signals, sent from the telephone office, have to change their circuit according to the type of the signal sent from the telephone office. The matching of the SPM equipment to the metering signal is done by replacing a printed circuit board, or by switching to a proper circuit among various ones which are installed in advance in the equipment and correspond to expected types of the metering signals.

In order to make clear the advantage of the present invention, prior art SPM equipment will be described briefly.

FIG. 1 is a block diagram of a prior art PBX system having an SPM function. A PBX cabinet 1 is installed in a subscriber's office, and performs as an extended branch service between a central office (CO) 9 and a branched telephone 3. Though there is shown only one telephone and one central office line 10 in the figure, usually a plurality of central office lines and telephones are interconnected and exchanged by a time division switch (TDSW) 2. Each telephone 3 is connected to the TDSW 2 via a line circuit (LN) 4 which is an interface circuit between the telephone 3 and the time division switch 2. On the central office side of the TDSW 2 is provided a central office trunk (CO trunk or COT) 5 which is an interface circuit between the central office line and the TDSW 2. This equipment is controlled by a common control unit (CC) 6. The PBX cabinet 1 is provided with an attendant console (ATT) 7, which commands the operation of the PBX manually by an operator. There may be various equipment provided in the PBX, but only the parts relevant to the present invention are shown.

Between the central office (CO) 9 and the PBX cabinet 1 is provided an SPM cabinet 8. The telephone signal and the call meter signal (sometimes abbreviated as meter signal) are sent from the central office to the PBX via a telephone line 10 which is usually a two-wire line. These signals are separated from each other in the SPM cabinet 8 and transferred to the PBX cabinet 1, respectively, through a speech line 11 and a meter line 12. In the figure, the path of the call meter signal is identified by a broken line. The call meter signal is treated by the common controller 6 and operates an indicator. The indicator may be a call meter (MET) 13, or any other display means such as a printer, or a cathode ray tube, etc.

FIG. 2 shows an example of a prior art SPM receiver for a common mode call meter signal. The equipment of FIG. 2 corresponds to the SPM cabinet 8 and COT 5 in FIG. 1. Throughout the drawings hereinafter, the same reference numerals or symbols designate the same or similar parts. The meter signal is sent from the central office together with a voice signal via a two-wire telephone line L1 and L2. The meter signal is composed of a pulse burst of 50 Hz, having the same phase to each other in both of the lines L1 and L2. The voice signal is a normal mode signal which has opposite phase to each other in these lines. The voice and meter signals are then fed to the central office trunk (COT) 5 of the PBX system.

On the central office side of the COT 5, there is provided a 50 Hz receiver 21 between the two-wire line L1, L2 and the ground, which is designed to be high impedance for voice signal frequency but becomes very low impedance for 50 Hz. So, the voice signal is fed to the COT 5 without loss, but the call meter signal of 50 Hz is shunted to the ground and does not appear in the COT 5. In FIG. 2, broken lines show the path of the call meter signal, and arrow marks show their phase indicating that they have equal phase to each other. Even if a fractional part of the 50 Hz signal appeared in the COT 5, the signal could not go further to the right in the figure. The COT 5 is provided with a hybrid circuit 23 which does not convert the two-wire common mode signal to a 4-wire signal, wherein the voice signal is converted to the 4-wire signal because of having a normal mode. In the figure, a symbol BN designates a balancing network for the hybrid circuit 23. The output of the hybrid circuit 23 is fed to the TDSW 2, and then switched to the destination of telephone equipment 3 (not shown).

The above is a description of the flow of the signal from the central office to the destination telephone equipment. The flow of the signal from the telephone equipment 3 to the central office is also transmitted through the same path, but in a reverse direction to that described above.

A reference numeral 24 designates an interface circuit which terminates the two-wire lines L1 and L2, and provides various functions such as dial pulsing, supervising, ringing and so on. These functions are controlled by a controller 25, but such operations are all the same as with ordinary PBX systems, and they are not particularly relevant to the present invention, therefore, further description is omitted for the sake of simplicity.

When the call meter signal is sent from the central office, the signal runs through the 50 Hz receiver 21 to the ground, therefore the call meter signal is detected by the 50 Hz receiver 21. Then, the 50 Hz receiver 21 closes a switch 26 to make a loop between the controller 25 and the lines MT, MR. This closed loop is detected by the controller 25 and a signal indicating that a meter signal is received is sent to the common controller (CC) 6.

FIG. 3 is an example of a prior art SPM receiver for a call meter signal of normal mode. In the figure, a broken line indicates the flow of the call meter signal, and arrow marks indicate that the phase of the meter signal is opposite to each other in the lines L1 and L2. Such a circuit is used for call meter signals of 12 kHz or 16 kHz. On the lines L1 and L2 is provided a band rejection filter 31 which is tuned sharply to 12 kHz or 16 kHz, corresponding to the frequency of the call meter signal. So, the voice signal (400–3,600 Hz) is transmitted to the interface circuit 24 without loss. While the call meter signal is branched to a 12 kHz/16 kHz receiver 32 by a transformer T 33. The circuit is designed such that the input impedance of the transformer 33 is very high for voice frequency, but also designed to become low impedance for 12 kHz/16 kHz. Thus, the call meter signal sent from the central office is detected by the 12 kHz/16 kHz receiver 32. The operation of the remaining parts of the PBX is the same as that of the circuit of FIG. 2.

Additional prior art SPM equipment is disclosed in, for example,

Japanese Laid Open Patent 58-19071 (published on Feb. 3, 1983) by K. Sato, or

Japanese Laid Open Patent 58-159054 (published on Sept. 21, 1983) by K. Sato

As has been described above, the prior art SPM equipment has to change their circuits corresponding to the call meter signals sent from the central office. The matching of the circuit to the meter signal is done by changing a printed circuit board. Some of the universal SPM equipment is installed with various circuit boards corresponding to expected types of the meter signals to deal and the circuit is switched manually to a proper one according to the type of signal sent from the central office. Therefore, the SPM cabinet becomes large, and expensive.

SUMMARY OF THE INVENTION

It is a specific object of the invention to provide a call meter signal receiver which is operable by both a common mode and a normal mode signal.

It is a further object of the present invention, therefore, to provide small sized and cheap inexpensive universal SPM equipment which can be operated by various types call meter signals.

The call meter signal receiver of the present invention is composed of a frequency tuned receiver having two input buffer circuits, the first buffer circuit receives the common mode meter signal, and the second buffer circuit receives the normal mode meter signal. The input terminal of the first buffer circuit is connected in parallel to both of the input terminals of the hybrid circuit of the COT, therefore the hybrid circuit picks up the common phase signal, but does not affect the normal mode signal. The input terminal of the second buffer circuit is connected to one of the output terminals of the hybrid circuit so that the hybrid circuit picks up only the normal mode signal. Therefore, the transformers or band rejection filters which take a large amount of space are all eliminated.

The outputs of these buffer circuits are fed to a frequency tuned amplifier. The receiving frequency of the frequency tuned amplifier is sharply tuned to 50 Hz, 12 kHz or 16 kHz (i.e., the frequency of the call meter signals) by a phase locked loop (PLL) circuit. The tuning frequency of the PLL circuit is variable by an externally attached circuit, composed of a capacitor and a plurality of resistors. Therefore, the receiving frequency of the frequency tuned amplifier may be switched to any one of the above call meter signals by switching the externally attached circuit.

These circuits are miniaturized using an integrated circuit (IC), so they can be put into the central office trunk circuit (COT) of the PBX cabinet without affecting the conventional circuit of the COT. Accordingly, the SPM cabinet is eliminated, and hence the system size and cost are reduced.

BRIEF DESCRIPTION OF THE DRAWINGS

Throughout the drawings, same reference numerals or notations designate same or similar parts.

DETAILED DESCRIPTION OF PREFERRED EMBODIMENTS

Figure 4:
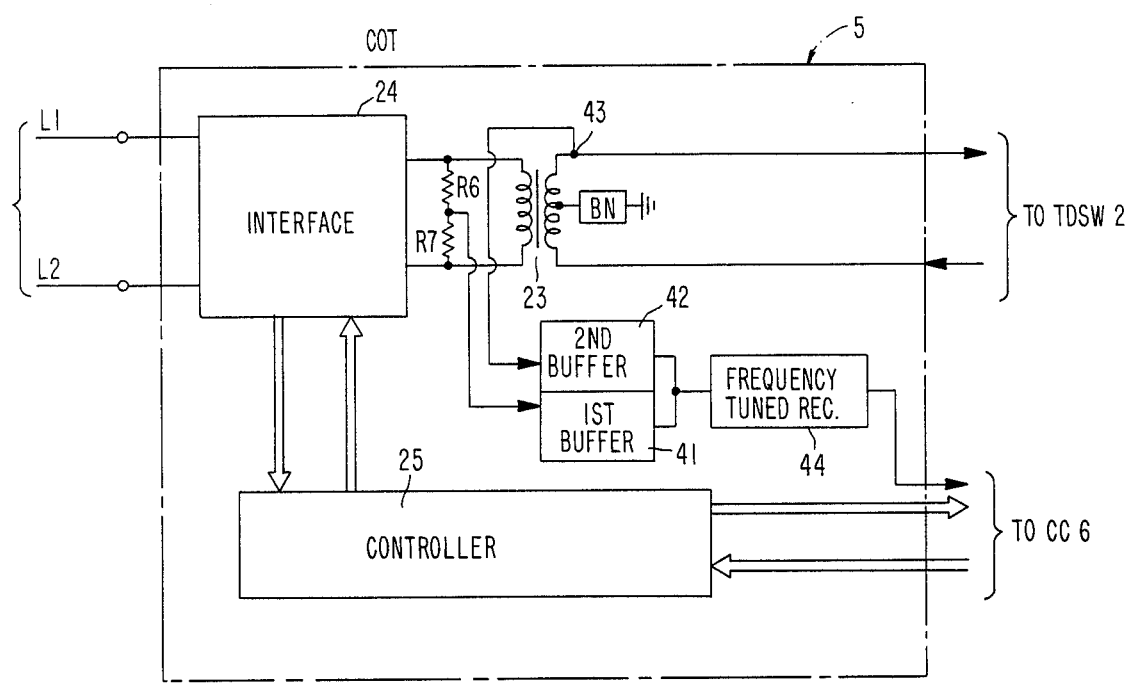
FIG. 4 is a block diagram showing one embodiment of the SPM system of the present invention.

The invention will be described referring to a preferred embodiment. FIG. 4 is a block diagram illustrating a general configuration of the SPM system of the present invention. FIG. 4 shows a control office trunk circuit (COT) 5 of a PBX station embodying the present invention. The central office lines L1 and L2 (usually they compose a two-wire line) are connected directly to the interface circuit 24. The output of the interface circuit 24 is connected to the hybrid circuit 23 which converts the 2-wire signal to a 4-wire signal. The interface circuit 24 and the hybrid circuit 23 are similar to those of prior art systems.

The input terminals of the hybrid circuit 23 are shunted by resistors R6 and R7 having a same high resistance value. From the junction point of R6 and R7 is taken out a common mode signal which is fed to the frequency tuned receiver 44 via a first buffer circuit 41. The frequency tuned receiver 44 is tuned sharply to 50 Hz by the phase locked loop (PLL), and has an input impedance matched to the resistance value of R6 and R7. Thus, the common mode meter signal is detected by the frequency tuned receiver 44. It will be apparent that the normal mode signals are not affected by these circuits. On the contrary, the common mode signals cannot be transferred to the output side of the hybrid circuit 23.

From one output terminal 43 of the hybrid circuit 23 the normal mode signal is fed to the frequency tuned receiver 44 via a second buffer circuit 42. The frequency tuned receiver 44 is sharply tuned to 12 kHz or 16 kHz by a PLL circuit. So, the normal mode meter signal is detected by the frequency tuned receiver 44. But the voice signals are not affected by these circuits, because the second buffer circuit 42 has a high input impedance for a voice signal. The normal mode call meter signal can not transmitted to the right in FIG. 4, because ordinary voice signal switching equipment which is connected to the right in the figure is cut off from the high frequency of 12 kHz/16 kHz.

The outputs of the frequency tuned receiver 44 are sent to the common controller (CC) 6, and the SPM equipment is controlled. These controls are similar to those of prior art SPM systems.

Figure 5:
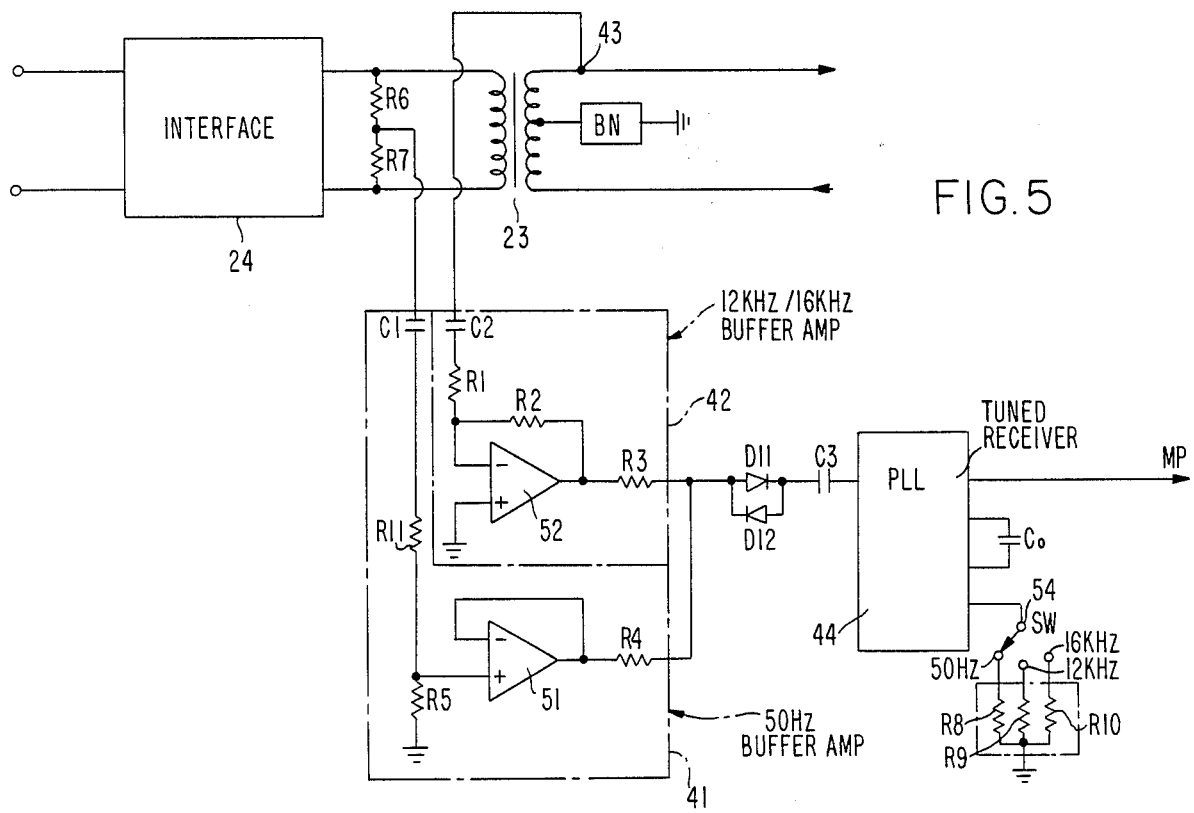
FIG. 5 is a circuit diagram of a call signal receiver for a SPM system embodying the present invention.

FIG. 5 shows a circuit diagram of a meter signal receiver embodying the present invention. The circuit is composed of a frequency tuned receiver 44 and two buffer circuits 41 and 42 which are used respectively for the 50 Hz and 12 kHz, or 16 kHz signals. The circuit is miniaturized using ICs. These ICs are all conventional and available on the market. The input buffer circuit 41 for 50 Hz, and the input buffer circuit 42 for 12 kHz/16 kHz include, respectively, operational amplifiers 51 and 52. These operational amplifiers 51 and 52 are integrated in a single IC package, for example MB 3615 fabricated by Fujitsu Limited (Kawasaki, Japan). The frequency tuned receiver 44 is available as an IC package, for example XR-2211 fabricated by Integrated Systems Inc. (Sunnyvale, Cal. 94088).

Referring to FIG. 5, the common mode meter signal is taken out from a junction point of the resistors R6 and R7 which are connected, respectively, to opposite input terminals of the hybrid circuit 23. The value of resistance of R6 and R7 is 100 k Ohms, for example. The circuit constants disclosed hereinafter are all typical values, therefore, several modifications are possible. The common mode signal is fed to the non-inverting input side (which is denoted as the "+" side hereinafter) terminal of the first operational amplifier 51 via a capacitor C1 of 0.1 $\mu$F, and a resistor R11 of 500 k Ohms connected in series. Therefore, the input impedance of the 50 Hz buffer circuit 41 becomes very high. The + terminal of the first operational amplifier 51 is grounded through a resistor R5 of 12 k Ohms. The output of the first operational amplifier 51 is fed back to the inverting side input terminal (which is denoted as "−" side hereinafter) of the first operational amplifier 51. The output signal of the first operational amplifier 51 is fed, via a resistor R4 to a pair of diodes D11 and D12. These diodes are connected antiparallel to each other, and perform as noise limiters which eliminate low voltage signals which are less than the forward junction voltage of the diodes. The pulse burst of the normal mode meter signal is then fed to a frequency tuned receiver 44 via a capacitor C3 of 1.5 $\mu$F.

The normal mode meter signal is taken out from one output terminal 43 of the hybrid circuit 23, and is fed to the second buffer circuit 42 via a series connected capacitor C2 and a resistor R1. The capacitance of C2 is 1500 pF, and the resistance of R1 is 10 k Ohms. Therefore, the input impedance of the second buffer circuit 42 becomes high for voice signal frequencies. The meter signal is fed to the − terminal of the second operational amplifier 52. The + terminal of the second operational amplifier 52 is grounded. The output of the second operational amplifier 52 is fed back to the − input terminal via a resistor R2 of 300 k Ohms. The output signal of the second operational amplifier 52 is led to the diode pair D11 and D12 via a resistor R3 of 1 k Ohms, and then fed to the frequency tuned receiver 44.

The common mode and normal mode meter signals are thus fed to the frequency tuned receiver 44. The frequency tuned receiver is available as an IC package. In the the above-described embodiment, XR-2211 IC can be used. The frequency tuned receiver is provided with a PLL circuit which is tunable to a desired frequency by varying an externally attached capacitor and resistor. When the frequency of the input pulse burst has an equal repetition rate to the tuned frequency of the PLL circuit, the frequency tuned receiver 44 outputs a logic signal, a meter pulse MP, of approximately 5 volts which is sufficient to drive an ordinary common control circuit of the SPM system. In an embodiment, an external capacitor $C_0$ is 0.01 $\mu$F, and the resistances of resistors R8, R9 and R10 are, respectively, 2 M Ohms, 8.06 k Ohms and 6.04 k Ohms for 50 Hz, 12 kHz and 16 kHz, respectively. The resistors R8, R9 and R10 are switched manually by a switch 54, so the receiving frequency of the receiver is sharply tuned to 50 Hz, 12 kHz or 16 kHz which is equal to the frequency of the meter signals expected to be sent from the central office. In practice, only one frequency and one mode of these meter signals is used in one central office, so the SPM receiver is switched to the corresponding frequency when the equipment is installed in the PBX by using the switch 54.

Figure 1:
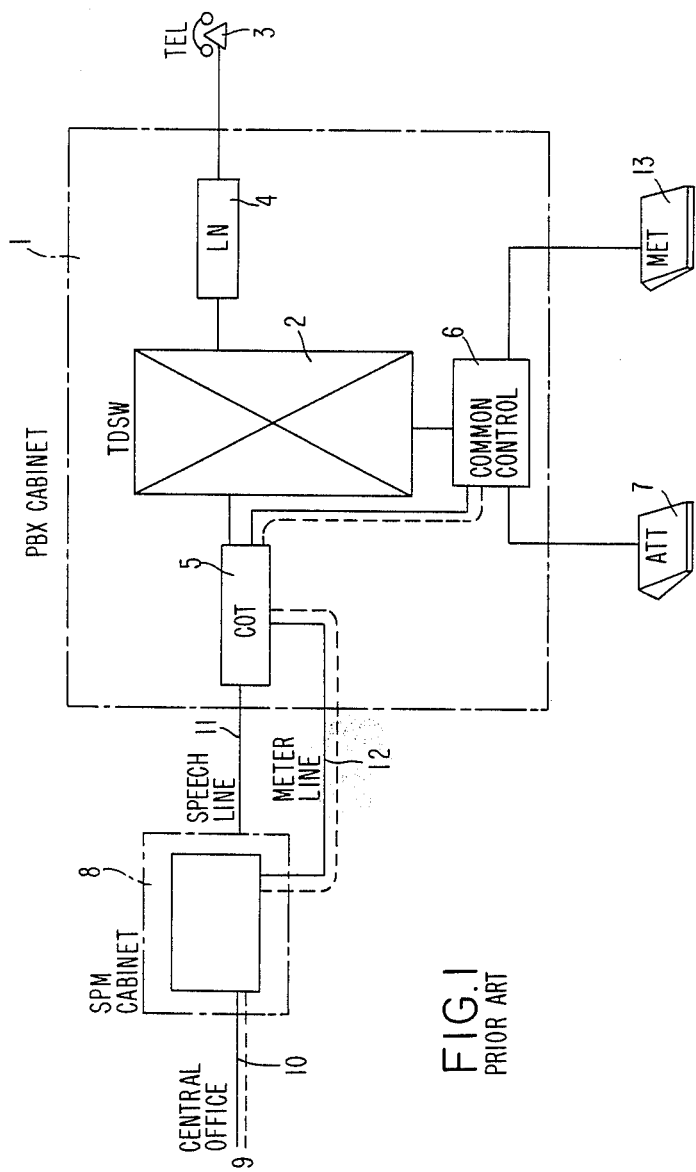
FIG. 1 is a block diagram of a prior art PBX system having an SPM function.
Figure 2:
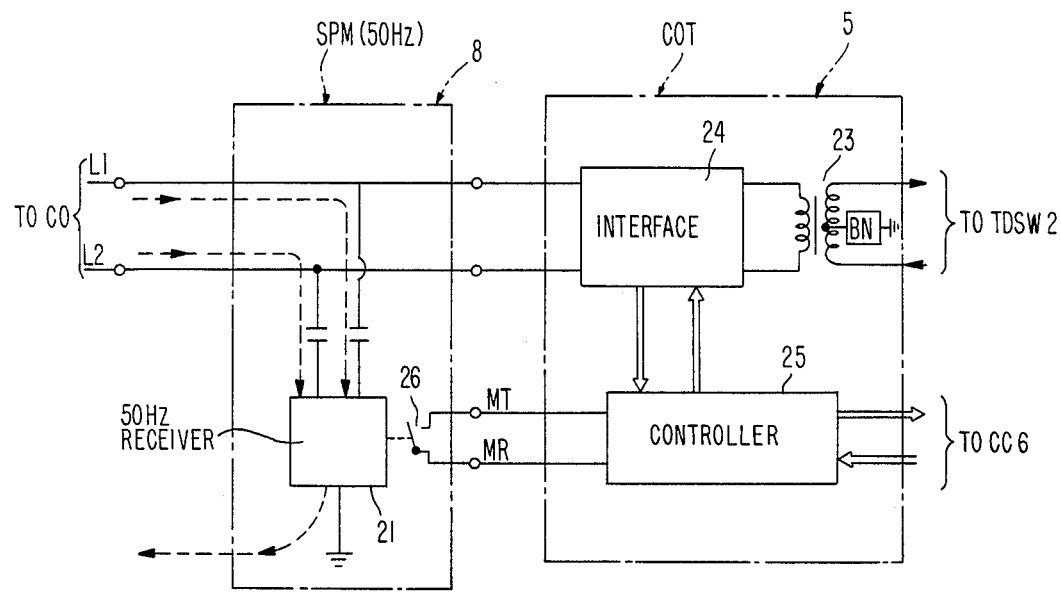
FIG. 2 is a block diagram of an exemplary prior art SPM meter signal receiver for a common mode call meter signal.
Figure 3:
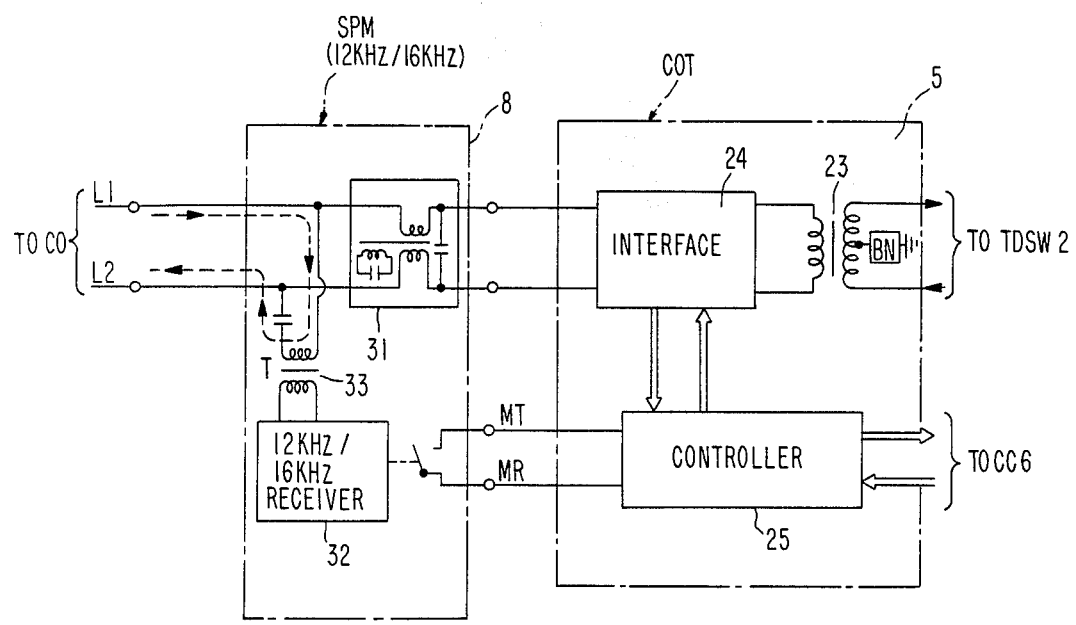
FIG. 3 is a block diagram of exemplary prior art SPM meter signal receiver for a call meter signal of a normal mode.
Figure 6:
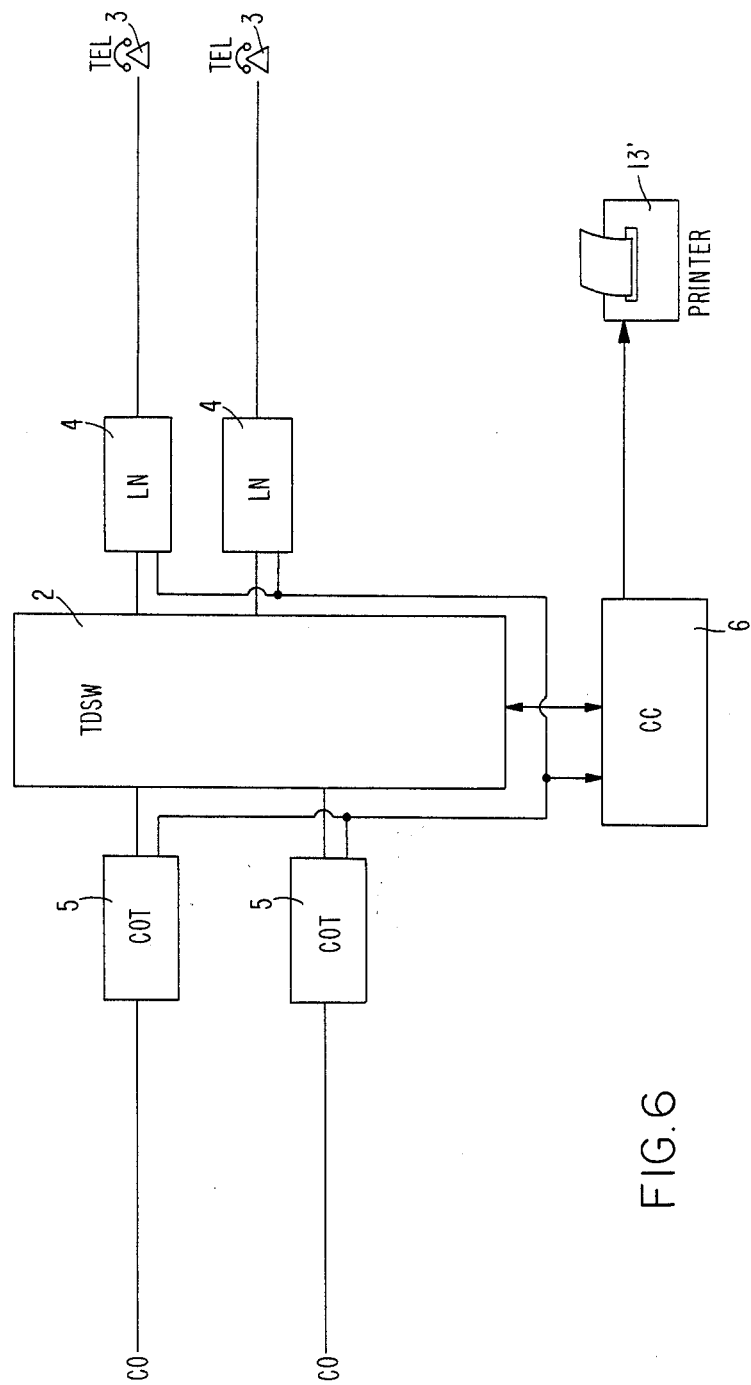
FIG. 6 is a block diagram showing how the SPM system is simplified by applying the present invention.

As mentioned before, the circuit of FIG. 5 is so small that it can be installed in the CO trunk of the PBX without disturbing the prior art CO trunks. The general configuration of the SPM system embodying the present invention, therefore, becomes as shown in FIG. 6. Comparing the SPM system of FIG. 6 to the prior art system of FIG. 1, the SPM cabinet 8 has been eliminated and the CO lines are directly connected to respective COT's 5. Thus, the system is simplified and the economic advantages are apparent. In the embodiment of FIG. 6, a printer 13' is used for displaying the output of the call meters. But the printer 13' can be replaced by or commonly used with any type of display unit, such as a cathode ray tube, a count meter and so on.

In above embodiments, two buffer circuits (41 and 42) have been described. But various modifications are possible, for example, the number of buffer circuits and frequency tuned receivers may be increased depending on the number of different types of meter signals dealt with. Meter signals can be connected to the input side of the hybrid circuit for receiving the common mode, and the remainder are connected to the output side of the hybrid circuit for receiving the normal mode signal. These modifications are all within the scope of the invention.

As has been described above, by applying the present invention, the SPM system can be operated by a call meter signal from a central office, and the SPM system of PBX can be operated by any type of call meter signals sent from the central office. Therefore, there is no need to change the circuit board for the type of signal used. The call meter signal receiver is made small in size, so the receiver can be installed in a CO trunk of the PBX terminal, and large, expensive filter circuits, transformers, cabinet and so on which occupy a large space in the SPM system, can be eliminated. Therefore, a very economic, small sized SPM system is realized.

We claim:

1. A call meter signal receiver for a subscriber's private metering system which is installed in a central office trunk provided in private branch exchanger equipment and is operated by a call meter signal sent from a central office, said call meter signal receiver comprising:
   (a) a plurality of buffer circuits for receiving a predetermined type of call meter signal sent from said central office; and
   (b) a frequency tuned receiver for detecting said call meter signal, said frequency tuned receiver being tuned to the frequency of said call meter signal.

2. A call meter signal receiver as set forth in claim 1, further comprising;
   (c) a switching means for switching a tuning frequency of said frequency tuned receiver to one of a predetermined frequency of said call meter signal.

3. A call meter signal receiver as set forth in claim 1, wherein said frequency tuned receiver comprises:
   a phase locked loop circuit for stabilizing the receiving frequency,
   wherein said receiving frequency is tuned to said predetermined frequency of said call meter signal by setting an externally attached circuit having a capacitor and resistors.

4. A call meter signal receiver as set forth in claim 1, wherein said plurality of buffer circuits comprises:
   (i) a first buffer circuit for receiving a common mode signal; and
   (ii) a second buffer circuit for receiving a normal mode signal.

5. A call meter signal receiver as set forth in claim 4, wherein said central office trunk comprises a hybrid circuit for converting a 2-wire signal to a 4-wire signal, said first buffer circuit is connected to an input side of said hyrbrid circuit, and said second buffer circuit is connected to an output side of said hybrid circuit, and wherein both first and second buffer circuits are output to said frequency tuned receiver.

6. A call meter signal receiver as set forth in claim 5, wherein two resistors are respectively connected to opposite input terminals of said hybrid circuit and connected together at a junction point by their other ends, said second buffer circuit is connected to one of the output terminals of said hybrid circuit and said first buffer circuit is connected to said junction point.

7. A call meter signal receiver as set forth in claim 5, wherein said first buffer circuit has a high input impedance, and said second buffer circuit has a high input impedance, for voice signals.

8. A call meter signal receiver for a subscriber's private metering system which is installed in a central office trunk provided in private branch exchanger equipment and is operated by a call meter signal sent from a central office, said call meter signal receiver comprising:
   (a) a hybrid circuit in said central office trunk having input and output terminals;
   (b) a first frequency tuned receiver for receiving a common mode call meter signal, and two resistors connected to opposite terminals of two input terminals of said hybrid circuit and the other ends of said resistors connected at a junction point wherein said first frequency tuned receiver is connected to said junction point; and
   (c) a second frequency tuned receiver for receiving a normal mode call meter signal, said second frequency tuned receiver being connected to one of said output terminals of said hybrid circuit.

9. A call meter signal receiver as set forth in claim 8, wherein said first frequency tuned receiver is tuned to the frequency of a common mode call meter signal, and said second frequency tuned receiver is tuned to the frequency of a normal mode call meter signal.

10. A call meter signal receiver as set forth in claim 9, wherein a receiving frequency of said first and second frequency tuned amplifiers is stabilized by a phase locked loop circuit, and said receiving frequency is tunable to the frequency the of call meter signal, sent from said central office by varying an eternally attached circuit having a capacitor and resistors.

* * * * *

UNITED STATES PATENT AND TRADEMARK OFFICE
CERTIFICATE OF CORRECTION

PATENT NO. : 4,750,200

DATED : June 7, 1988

INVENTOR(S) : SATO et al.

It is certified that error appears in the above-identified patent and that said Letters Patent is hereby corrected as shown below:

Col. 3
Line 44, delete "to" (second occurrence);
Line 45, delete "deal".

Col. 5
Line 10, delete "can not" and insert --cannot be--.

Col. 6
Line 9, delete "the" (second occurrence).

Signed and Sealed this

Sixth Day of September, 1988

Attest:

DONALD J. QUIGG

Attesting Officer

Commissioner of Patents and Trademarks